(12) United States Patent
Qi et al.

(10) Patent No.: US 7,168,862 B2
(45) Date of Patent: Jan. 30, 2007

(54) OPTICAL FIBER DECORATION DEVICE USING LED LIGHT SOURCE AND ARTICLE DECORATED THEREBY

(75) Inventors: Chen Qi, Tokyo (JP); Yasunari Sugiyama, Tokyo (JP)

(73) Assignee: Elite Trading Co., Ltd., Tokyo (JP)

( * ) Notice: Subject to any disclaimer, the term of this patent is extended or adjusted under 35 U.S.C. 154(b) by 0 days.

(21) Appl. No.: 10/501,497

(22) PCT Filed: Feb. 25, 2003

(86) PCT No.: PCT/IB03/00744

§ 371 (c)(1),
(2), (4) Date: Jul. 12, 2004

(87) PCT Pub. No.: WO03/081125

PCT Pub. Date: Oct. 2, 2003

(65) Prior Publication Data

US 2005/0052883 A1    Mar. 10, 2005

(30) Foreign Application Priority Data

Feb. 25, 2002 (JP) .............................. 2002-048845
Feb. 17, 2003 (JP) .............................. 2003-039020

(51) Int. Cl.
*G02B 6/36* (2006.01)
*H01S 3/30* (2006.01)

(52) U.S. Cl. ........................ 385/92; 385/88; 385/89; 385/93; 385/147; 385/901; 362/555; 362/553

(58) Field of Classification Search ................ 385/147, 385/901, 88, 89, 92, 93, 94; 362/555, 553, 362/566
See application file for complete search history.

(56) References Cited

U.S. PATENT DOCUMENTS

| | | | | |
|---|---|---|---|---|
| 4,234,907 A | * | 11/1980 | Daniel ........................ | 362/556 |
| 4,875,144 A | * | 10/1989 | Wainwright ................. | 362/103 |
| 5,820,248 A | * | 10/1998 | Ferguson ..................... | 362/123 |
| 5,890,790 A | * | 4/1999 | Osawa ......................... | 362/27 |

(Continued)

FOREIGN PATENT DOCUMENTS

JP          59-82215         6/1984        ............. 385/147 X (Continued)

*Primary Examiner*—Brian M. Healy
(74) *Attorney, Agent, or Firm*—Tarolli, Sundheim, Covell & Tummino LLP

(57) ABSTRACT

An optical fiber decoration device has various merits: small power consumption, no danger of fire, simple water-proof design and economical, battery can be used, excellent portability, long service life of light source, and no danger of destruction during transportation. The optical fiber decoration device is characterized by having an LED light source consisting of a plurality of LED's which are arranged at an end of optical fiber for emitting one or more colors and partially superimposed, enabling synthesis of colors. In FIG. 1, the optical fiber decoration device (I) includes an LED light source unit (2) and an optical fiber (1a). The distance L between the LED light source (2) and the optical fiber is 5 to 100 mm. Red, blue, and green LED's are used to realize multiple colors. The optical fiber decoration device can be used for signboards, outdoor decorations, bus advertisement, indoor decorations, decorations in an aquarium, unit type Christmas trees, clothes, and the like.

24 Claims, 12 Drawing Sheets

U.S. PATENT DOCUMENTS

| | | | |
|---|---|---|---|
| 6,056,427 A * | 5/2000 | Kao | 362/581 |
| 6,139,166 A * | 10/2000 | Marshall et al. | 362/231 |
| 6,200,002 B1 * | 3/2001 | Marshall et al. | 362/231 |
| 6,264,346 B1 * | 7/2001 | Pashley et al. | 362/244 |
| 6,361,198 B1 * | 3/2002 | Reed | 362/554 |

FOREIGN PATENT DOCUMENTS

| | | | | |
|---|---|---|---|---|
| JP | 62-52493 | 4/1987 | | 385/147 X |
| JP | 1-111000 | 7/1989 | | 385/147 X |
| JP | 3-98100 | 10/1991 | | 385/147 X |
| JP | 3-104649 | 10/1991 | | 385/147 X |
| JP | 4-77199 | 7/1992 | | 385/147 X |
| JP | 8-7625 | 1/1996 | | 385/147 X |
| JP | 9-152840 | 6/1997 | | 385/147 X |
| JP | 10-50107 | 2/1998 | | 385/147 X |
| JP | 10-100599 | 4/1998 | | 385/147 X |
| JP | 2000-156101 | 6/2000 | | 385/147 X |
| JP | 3079520 | 8/2001 | | 385/147 X |

* cited by examiner

L=5~100mm

OPTICAL FIBER DECORATION DEVICE USING LED LIGHT SOURCE AND ARTICLE DECORATED THEREBY

FIELD OF INVENTION

This invention relates to optical fiber decoration devices. Specifically, it relates to optical fiber decoration devices using LED (light emitting diode) as a light source and decoration items using these devices. The light source can emit multiple colors, has a long lifetime and low power consumption, is very safe, and has a fantastic appearance.

BACKGROUND OF THE INVENTION

Recent years have seen the development of decoration items using lights, the light source being lamps or the combination of lamps and optical fiber, to decorate Christmas trees and advertising boards. For instance, in the case of general Christmas trees, the effect of the decoration has been achieved by means of blinking or continuously light colored bulbs that were mounted to branches and treetops of natural and artificial trees. In order to change the color, a technique was applied by inserting a colored translucent medium, such as the colored glass or colored cellophane, between a lamp of the light source and the light entrance of the optical fiber ends and letting the light pass through this translucent medium and illuminate an optical fiber.

The decoration item, like the above-mentioned, can be dangerous because fire can occur due to the heat of the lamp and the adaptor, since it uses a lamp with high power consumption. This results in not only a complex waterproof design but also a higher cost. When miniaturizing the item, it is difficult to use a battery and hence has poor portability. Lamp has faults such as a short lamp lifetime and high rate of generating defective goods due to the failure from accidents during transportation. Therefore, the optical fiber decoration device using lamps as a light source has the problem on restrictions of the usage and the place. On the other hand, when a large-scale decoration item is produced, for instance a Christmas tree, the length of optical fibers becomes long from the light source when a lamp is used as the light source. In this case, there is a problem that the brightness from the other end decreases because the attenuation of light occurs when passing through an optical fiber. When an electric decoration was attempted on clothes, the optical fiber decoration device using a lamp as the light source does not allow wearing for a long time as well as has a poor portability due to the heat.

ADVANTAGES AND SUMMARY OF THE INVENTION

As a result of examining these problems, this invention was achieved to solve the above-mentioned problems using a LED light source in place of a lamp.

The subjects invention is providing the optical fiber decoration device having the following merits: small power consumption, so there is no danger of fire due to the heat generated from the lamp and the adaptor, etc.; an easy and economical waterproof design, being able to use a battery etc.; good portability; long lifetime of the light source; no failure from accident under transportation.

The above-mentioned subjects were achieved by the following inventions.

(1) An optical fiber decoration device has an LED light source, the LED light source has multiple LEDs arranged at the end of the optical fiber to emit at lease monochromatic or polychromatic light, and also enables the color mixing by overlapping of some of these colors.

(2) An optical fiber decoration device of claim 1 wherein the end of the optical fiber and the head of LED are integrated.

(3) An optical fiber decoration device of claim 1 or 2 wherein said between multiple LED light source and optical fiber bundle arrange a condenser lens.

(4) An optical fiber decoration device of claim 1 to 3 wherein the luminosity of singular or multiple LEDs at least gradually changing.

(5) An optical fiber decoration device described in either one of claim from 1 to 4 wherein said it can create multiple colors that is added colors to mix by independently changing the luminosity of each of the multiply LEDs.

(6) An optical fiber decoration device described in either one of claim from 1 to 5 wherein the luminosity of the LED controls with a microcomputer.

(7) An optical fiber decoration device described in either one of the above-mentioned claims from 1 to 6 wherein the emitting color or the luminosity can be changed by a manual switch.

(8) An optical fiber decoration device described in either one of claim from 1 to 7 wherein said the luminosity is changed by detection of sound and light with a sensor.

(9) An optical fiber decoration device described in either one of claim from 1 to 8 wherein it uses a unit that integrates the optical fiber decoration device and the LED power supply.

(10) An optical fiber decoration device described in either one of claim from 1 to 9 wherein it uses power supply from solar cells as the LED power supply.

(11) An optical fiber decoration device described in either one of claim from 1 to 10 wherein said at least a part of the optical fiber decoration device is waterproof.

(12) A decoration item uses optical fiber decoration devices described in either one of the claim from 1 to 11.

(13) A decoration item of claim 12 wherein said a decoration item consists of a decorated part and a support part; the support part contains a power supply and a controller; LEDs are arranged at necessary places of the decorated part; the electric power is supplied from the lead line connected by the above-mentioned controller; light is emitted from the LED light source.

(14) A decoration item characterizing wherein LED light source devices consist of a LED light source and an IC board are arranged somewhere on the decoration item, and a light entrance face of the optical fiber is arranged in this LED light source device.

(15) A decoration item described in either one of claim from 1 to 13 wherein said LED light source devices consisting of a LED light source and an IC board are arranged somewhere on the decoration item, and a light entrance face of the optical fiber is arranged in this LED light source device.

(16) A decoration item described in the above-mentioned claim 14 or 15 is a Christmas tree.

(17) A decoration item described in the above-mentioned claim 13 is a Christmas tree, the optical fiber is arranged on branches and in the vicinity of the treetop by connecting the multiple units of the optical fiber decoration device described in the above-mentioned claim 9 through connection part.

(18) A decoration item described in the above-mentioned claim 13 is a Christmas tree and the shape of a Christmas tree is formed by combining and connecting more than two of the units of the optical fiber decoration devices described in the above-mentioned claim 9.

(19) Clothes use an optical fiber decoration devices described in above-mentioned claim 1 to 13 to decorate.

(20) Clothes described in the above-mentioned claim 19 are wedding dresses.

The optical fiber decoration device of this invention is used for various decorative applications. It is not specifically limited to the example with an optical fiber decoration device enumerated. It can be used for, for instance, signboard, outdoor decoration, park outdoor decoration, creating an fashionable environment, motorcycle advertisement, bicycle, bus advertisement, automobile, toy (for instance, light saber), indoor decoration, water tank, Buddhist altar, Christmas tree, unit type Christmas tree, decoration, accessory, stuffed animal, book, clothes, public construction, etc. Here, the Christmas tree includes the wooden type and the wreath (the annular type) of Christmas trees.

BRIEF DESCRIPTION OF THE DRAWINGS

FIG. 15*a* shows the cross-sectional diagram of the light source device employed on the Christmas trees of this invention.

FIG. 15*b* and FIG. 15*c* show the cross-sectional diagram of the light source device.

FIG. 15*d* shows the cross-sectional diagram of the light source device.

DESCRIPTIONS OF SYMBOLS

Figure 1:
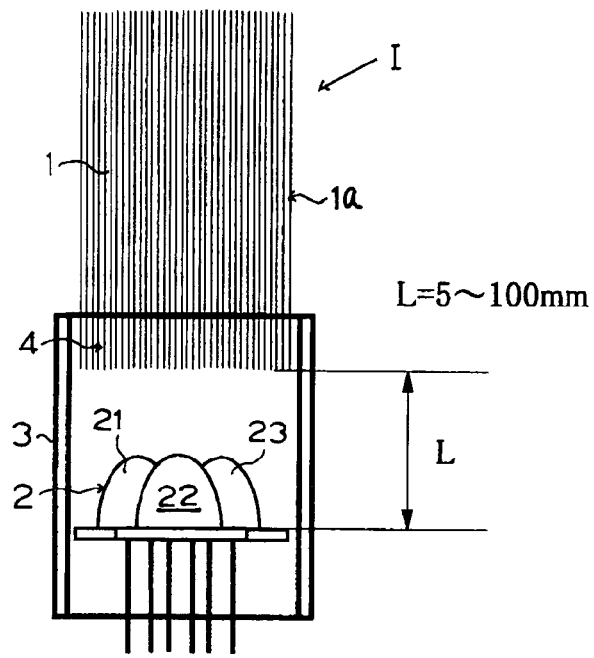
FIG. 1 shows the cross-sectional diagram of the optical fiber decoration device of this invention.

1. The optical fiber
2. The LED or the LED light source
3. The vessel and the case
4. The adhesive joint or the adhesive
5. The circular cylinder or the annular cylinder
6. The controller
7. The power (batteries included)
8. The light emission control device
9. The accumulator
10. The solar cell
11. The water proof connector
12. The code
13. The prevention case
14. The decorative tree or the tree
14*a*. The cavity or the void
15, 26. The branch
16. The leaf
17. The support or the seat mounts
18, 18*a*, 18*b*, 18*c*, 18*d*, 18*e*, 18*f* 18*g*. The optical fiber bundle
19. The morning-glory-shaped or the star-shaped
20. The lead wire,
21. The plug socket
22. The cylinder or the circular cylinder
23. The annular cylinder
24. The circular cylinder
25. The house or the room
27. The collar
28. The IC board
29. The Fixture
30. The lens
31. The transparent board
32. The lighting condition of the LED light
33, 33*a*, 33*b*, 33*c*, 33*w*. The LED light source devices
34. The support stick
34*a*. The metal fitting
35. The support
36*a*, 36*b*, 36*c*. The circular cylinder
37. The hollow branch
38*a*, 38*b*, 38*c*. The circular cylinder with a side tube
$\theta$ The light angle of the LED light
I, II, III, IV, V, VI, VII, VIV. The optical fiber decoration device (for examples, the Christmas trees included)
VIa, VIb, VIc, VIIa, VIIb, VIIc. The block of the Christmas trees
VIII. One example of the configuration of the LED light source device

DETAILED DESCRIPTION OF THE PREFERRED EMBODIMENTS

Figure 5:
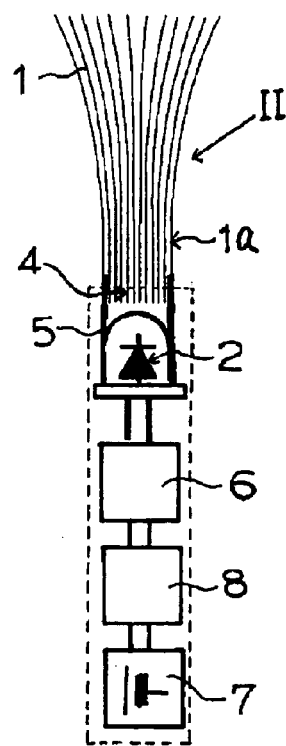
FIG. 5 shows the cross-sectional diagram of the integration of the optical fiber decoration device with its accessories of this invention.

In the following context, this invention will be explained more specifically with figures. FIG. 1 shows a cross-sectional diagram which the basics of the optical fiber decoration device of this invention. In FIG. 1, the optical fiber decoration device described in claim 1 of this invention is characterized by that multiple LEDs emitting at least monochromatic or polychromatic light are installed at the end of the optical fiber, and has a LED light source these which enable the color mixing by overlapping of some of these colors. The optical fiber decoration device I consists of a LED light source unit 2 and an optical fiber 1a. In order for a LED light source unit 2 to emit light, it is necessary to connect a controller (refer to FIG. 5) to the LED. Thus, that the LED light source emits light means that not only a controller is used but also a controller is integrated with the LED light source.

The optical fiber 1 used for this invention is the one that the light passes through within fiber, light enters from one end of the optical fiber and is emitted from another end. The diameter of the optical fiber 1 is 0.4–0.5 mm, and 0.1–0.3 mm is preferable. The optical fiber bundle 1a which bundled this optical fiber 1 consists of 10–30000 optical fibers 1. 100–30000 is preferable and 100–20000 is more preferable. Optical fiber is usually formed so that light may not leak from the perimeter wall. In this invention, optical fibers are constructed to allow light leaking from the perimeter wall at regular or irregular intervals. For example, a crack may be created in the perimeter wall to allow the light leakage from there. The crack may also be a point, a line, or a spiral line. The distance between the LED unit 2 and the optical fiber 1a, being referred to as L, is 5–100 mm preferably. Since L changes with the kinds of the LEDs and the luminosity, it is desirable to determine the optimal distance using a simple test before it is used. As one example for the configuration to maintain the distance L and the connection between the LED unit 2 and optical fiber 1a, an arrangement to maintain the distance L is desirable after one end 1b of the optical fiber bundle is bonded to form a joint 4 using an adhesive.

Figure 3:
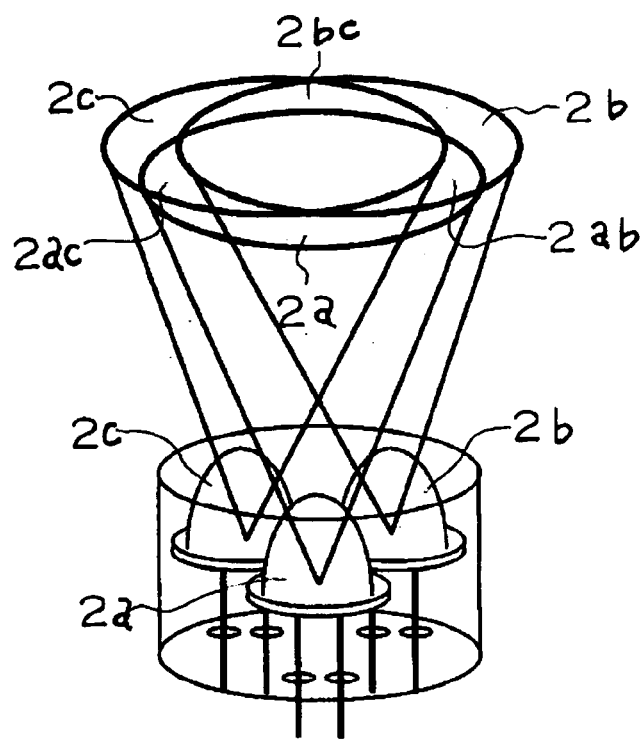
FIG. 3 shows the color mixing of the optical fiber decoration device of this invention.

Although the optical fiber decoration device I of this invention can be arranged one or more LEDs, it may be desirable to arrange three LEDs with different colors. The most desirable example is shown in FIG. 3. FIG. 3 shows a perspective diagram of the example of the mixing colors of red, blue, and green. In FIG. 3, the LED unit 2 is formed by containing three LEDs of red LED 2c, blue LED 2a, and green LED 2b in the container 5. This unit 2 emits three primary colors, emits light in yellow 2bc by red 2c and green 2b, emits light in bluish green (cyanogen) 2ab by blue 2a and green 2b, and emits light in purplish red (magenta) 2ac by red 2c and blue 2a. The way to emit light of three primary colors was explained in the example of this invention, without being limited to these, two or more different colors may be overlapped partially, thereby, countless mixtures of colors can be obtained. The illumination angle (θ) of a LED lamp used as a LED light source (hereafter called a lamp also) depends on the diameter of the LED lamp. For example, when the diameter of this lamp is larger than 2.5 mm, the desirable illumination angle (θ) is 10–50 degree. In this case, the interval of the multiple LED lamp of 0–15 mm is desirable. A few to multiple colors can be created by making the distance from the point of a LED lamp emitting light to the light entrance of an optical fiber larger than the intersection of illumination lights. Although in these examples, the light sources are fixed, when a LED light source is moved forward and backward, or it is moved while rotating, it can create countless colors by the motion (refer to FIG. 15b) even if the distance of the illumination light is below an intersection.

When the diameter of a LED lamp, for example, is less than 2.5 mm, the illumination angle of 0–35 degree is desirable. The interval of multiple LED lamps is 0–15 mm, similar to the case that the diameter of the LED lamp mentioned above is over 2.5 mm, a few to multiple colors can be created by making the distance from the point of a LED lamp emitting light to the light entrance of an optical fiber larger than the intersection of illumination lights. Although the above examples are light sources that are fixed, when a LED light source is rotated, it can create countless colors by the motion even if the distance of the illumination light is below an intersection. Especially when a LED lamp is moved back and forth or rotated, that is, making a LED lamp move (such as up and down, left and right, slant, etc. with proper angles, back and forth motion, or regular and irregular rotation), one, a few to many colors can be created. In this invention, controls of blinking, 2-color control, 3-color control, etc. can be performed by combining an emitting control device with the optical fiber decoration device. Some arranged LED lamps can blink regularly or irregularly, and they can be made dark or bright by gradually weakening and strengthening the luminosity. The color from an optical fiber using such a LED light source can be varied. This control device is made by mechanical control, for example, a control rod is rotated by a motor and the electrical contact and non-contact. It is also controllable using electric elements.

Figure 2:
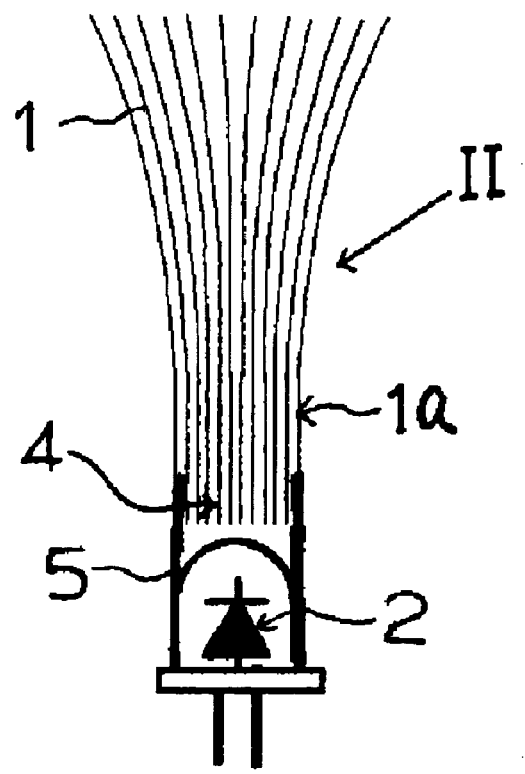
FIG. 2 shows he cross-sectional diagram of the second optical fiber decoration device of this invention.

The optical fiber decoration device described in the claim 2 of this invention is characterized by integration of the end of an optical fiber with the head of LED. FIG. 2 is a cross-sectional diagram showing the optical fiber decoration device. As shown in FIG. 2, integration of the optical fiber decoration device (refer to II) was formed by inserting and fixing a cylinder 5 into the head of a LED, and then inserting light entrance of optical fiber bundle 1a in the upper part of a cylinder 5. Another variation is that the adhesion part 4 is formed by inserting a LED 2 into a cylinder 5 and bonding bundle 1a of an optical fiber 1 with an adhesive. When the upper surface of the LED is round, bundle 1a of an optical fiber 1 may be pasted along the circular side. For decoration, LED may be desired to emit monochromatic light, any three primary colors, as well as any colors by mixing two or more colors. Arbitrary colors can be arranged into the required part of the decoration by this composition.

Figure 4:
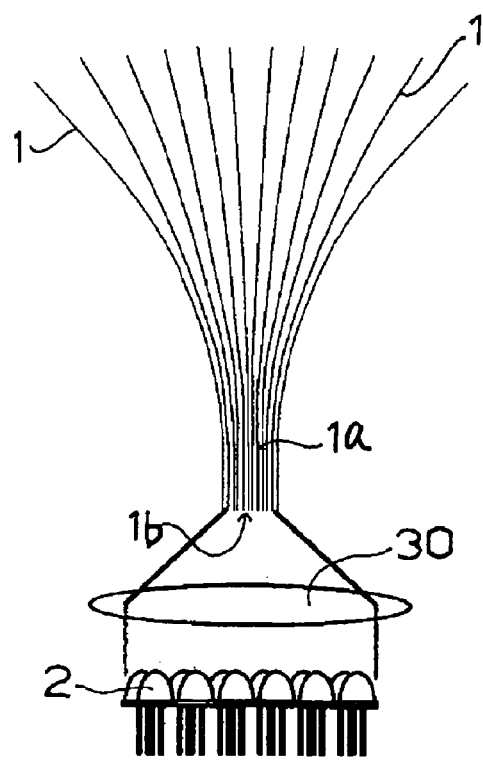
FIG. 4 shows the cross-sectional diagram of the third optical fiber decoration device of this invention.

Because the optical fiber decoration device described in the claim 3 of this invention is characterized by arranging a condenser lens between multiple LED light sources and the optical fiber, the luminosity of the LED light source, or the luminosity from LEDs to an optical fiber bundle, can be increased. FIG. 4 is a cross-sectional diagram showing the optical fiber decoration device with a condenser. In FIG. 4, the luminosity is increased by increasing the number of LEDs 2, and a lens 30 is inserted between the optical fiber bundle 1a and the LED light source 2 to collect the LED illumination. The illumination is condensed into the light entrance 1b of an optical fiber bundle 1a with this lens 30. Consequently, the luminosity at the light entrance of an optical fiber increases, so the light emitted from the tip of an optical fiber becomes very bright. According to the kind of lens, the brightness can be adjusted by increasing the brightness of a LED light source, or changing the width and the illumination angle of the beam. As for lens, the change in light can be achieved by scattering light using a special lens, for example, a lens with facet-cut surfaces. In addition, the beam emitted from a LED lamp can be controlled by a lens, it can be set up so that LED lamps may blink or change colors by interlocking with one or more IC boards using the above-mentioned controller, and LED lamps can blink and change colors accompanying the sound and rhythm of music.

The optical fiber decoration device described in the claim 4 of this invention is characterized by that the luminosity of singular or multiple LEDs can be at least gradually changed. The optical fiber decoration device described in the claim 5 of this invention is characterized by that multiple colors can be created that is added colors to mix by independently changing individual luminosity of the multiply LEDs. In the invention described in the claim 4 and 5, the emitting color (mixed color) can be controlled by decreasing or increasing the luminosity of more than two kinds of LEDs, using the emitting control device to control LED luminosity. The decorative effect can be enhanced by blinking the LEDs. Blinking can be formed by the combination of one, two, three, or various colors in the case of many colors.

The optical fiber decoration device described in the claim 6 of this invention is characterized by controlling the LED luminosity with a microcomputer. Operations of changing luminosity and blinking using microcomputer technology can be carried out by the optical fiber decoration device, described in the above-mentioned claim 4 and 5. This control circuit can be carried out using either mechanical or electric methods, and can use well-known technologies in this technical field. To change the emitting color or the luminosity one can manually switch the optical fiber decoration device described in the claim 7 of this invention. In this case, to change the pattern of the luminosity one can change the luminescence control circuit with a manual switch, or change the software controlled by a microcomputer. For example, LEDs are arranged so that each color of the red, blue, and green LEDs may overlap partially. A switch is installed for these LEDs so that the desired color can be obtained by switch operation, switch on or switch off. If red LED is turned off, an overlapped color that is yellow color can be obtained by mixing lights from the blue and green LEDs.

The optical fiber decoration device, described in the claim 8 of this invention, can carry out switching according to the signal from a sensor by the manual switch described in the claim 7. The sensor used in this case is characterized by changing luminosity controlled by the detection of sound or light. For example, a sensor for detection of sound or light is installed in the optical fiber decoration device, and the luminescence pattern is controlled by a microcomputer program according to the signal detected by the sensor.

The optical fiber decoration device, described in the claim 8 of this invention, is characterized by using a unit integrated from the optical fiber decoration device with the LED power supply. In the optical fiber decoration device I in FIG. 1, the optical fiber decoration device I shown in FIG. 2, and the optical fiber decoration device in FIG. 4, controller 6, luminescence controller 8, and power supply 7 are connected in the optical fiber decoration device II as shown in the block chart in FIG. 5. Among these, controller 6 is sometimes built in and integrated with the optical fiber decoration device, and sometimes arranged separately with the optical fiber decoration device. Here, the controller 6 is used to control the emitting of the LED light source of the optical fiber decoration device. The luminescence controller 8 is used to control the luminosity after the event when the LED light source emits light. For example, it can be controlled by increasing and decreasing the luminosity or by blinking. Therefore, the integration of the optical fiber decoration device 1I with a power supply 7 naturally means the integration of a controller 6, a luminescence controller 8, and a power supply 7.

A power supply 7 is used as a LED power supply, such as a battery or a storage battery. It is desirable to integrate the optical fiber decoration device, the controller 6, the luminescence controller 8, and power supply 7 as a unit. For example, making them into a unit requires integration of an optical fiber, LED, a controller, a luminescence controller, and a power supply in a container or a case. Not to mention, a switch to supply to the optical fiber decoration device and cut the electric power, has been installed.

Figure 6:
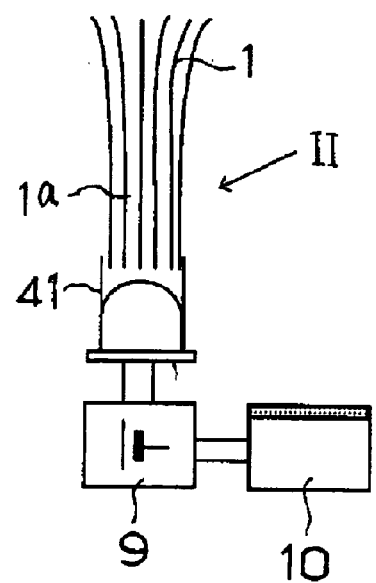
FIG. 6 shows the cross-sectional diagram connections between the optical fiber decoration device and the solar cell of this invention.

The optical fiber decoration device, described in the claim 10 of this invention, is characterized by using a power supply obtained from a solar cell as a power supply for LED. It is advantageous to use a solar cell as a power supply since a LED has little power consumption. When using a solar cell, it is desirable to charge a supplemental storage battery for a solar cell, and then use the storage battery as a direct power supply. FIG. 6 is a circuit diagram showing the example to use the solar cell for the power supply. In FIG. 6, the optical fiber decoration device II is connected with the storage battery 9 and the solar cell 10. In the optical fiber decoration device II, the electric power is supplied by storage battery 9, the storage battery 9 is supplied by a solar battery 10, which is charged in daytime.

Figure 7:
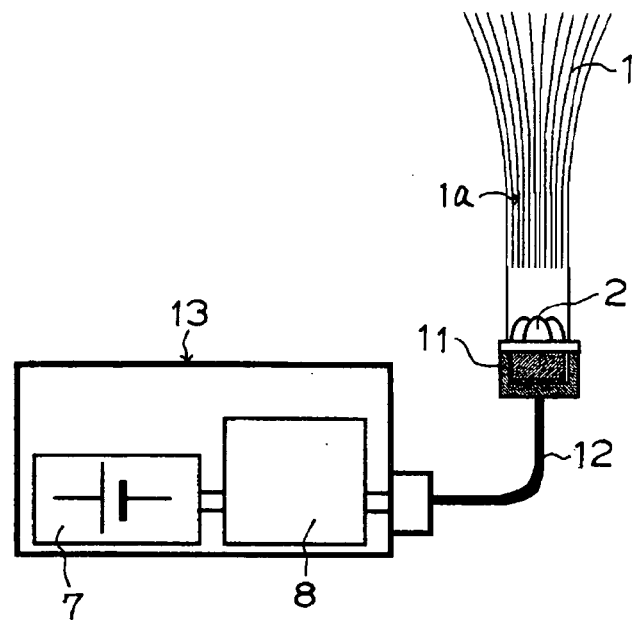
FIG. 7 shows the cross-sectional diagram of the prevention structure for the optical fiber decoration device of this invention.

At least a part of the optical fiber decoration device, described in the claim 11 of this invention, is waterproof. The waterproof method is to build a waterproofing structure by filling up and covering with resin to make the part watertight in LED light source. For example, the whole part of a LED light source, except the optical fiber in an optical fiber decoration device, is made waterproofing (that is, the whole LED light source) by covering with resin. FIG. 7 is a cross-sectional diagram showing an example of the waterproofing structure of the optical fiber decoration device of this invention. FIG. 7 shows a cross-sectional diagram of waterproofing of the optical fiber decoration device shown in FIGS. 1 to 4. In FIG. 7, the lower part of the LED light source, except the optical fiber of optical fiber decoration device, is inserted in a prevention connector 11, and a code 12 extended from this connector 11 is connected to the waterproofing case 13. The waterproofing case 13 contains the luminescence controller 8 and the power supply 7. When a power supply 7 uses a battery, in order to exchange a battery, a lid is installed in a waterproofing case and the lid can be opened for the battery exchange. In this case, not to mention, the opening and shutting part of the lid is made watertight.

Figure 8:
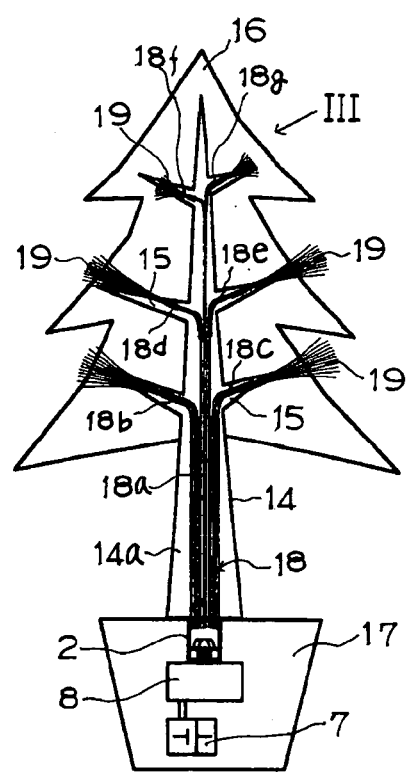
FIG. 8 shows the cross-sectional diagram of the first application example for the optical fiber decoration device of this invention.

The optical fiber decoration device, described in the claim 12 of this invention, is a decoration device characterized by using the optical fiber decoration device described in either one from the above-mentioned claim 1 to 11. Here, a Christmas tree is given as an example for explanation. FIG. 8 is a side view showing the Christmas tree decorated by the optical fiber decoration device. In FIG. 8, Christmas tree 1I1 uses a bowl as a support part, the plinth 17 of this bowl has an artificial trunk 14 for a Christmas tree, and this tree has the branch 15 and the leaf 16. There is a cavity 14a inside the trunk 14 and the branches 15. The optical fiber bundles are distributed to this cavity 14a according to the number of branches 15, the tip of an optical fiber is exposed at the branch tip along each branch 15. The exposed tip may be expanded into a flower shape 19 of the morning-glory. On the other hand, a plinth 17 contains the LED light source 2, the luminescence controller 8, and the power supply 7. At the upper part of the LED light source 2, a bundle of optical fiber (1000 beams/bundle) 18a is installed at the position of L=10 mm from the light source. The tip of this optical fiber bundle 18a is distributed into a proper number along each branch, and is further divided into 40–50 beams at the tip of a branch.

Figure 9:
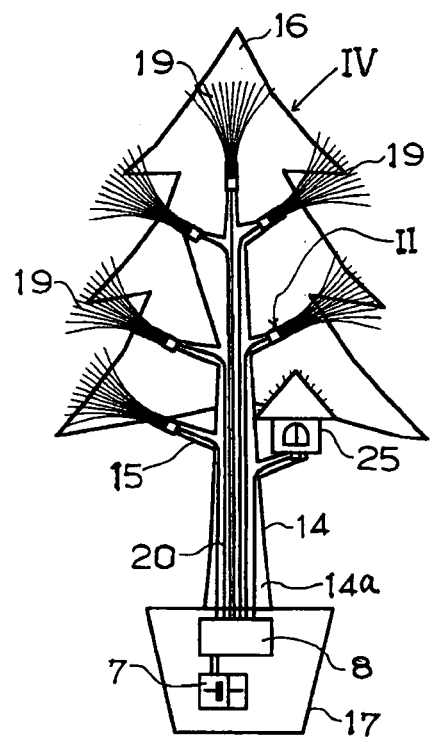
FIG. 9 shows the cross-sectional diagram of the second application example for the optical fiber decoration device of this invention.
Figure 10:
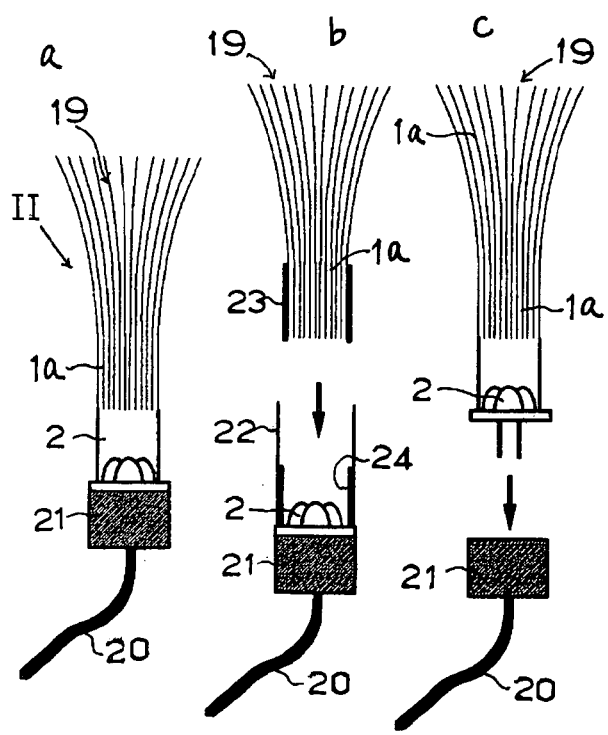
FIG. 10 shows the cross-sectional diagram of the form of the optical fiber decoration device of this invention.

FIG. 9 is a cross-sectional diagram showing another example of a Christmas tree of this invention. In FIG. 9, the Christmas tree IV consists of a trunk 14 for Christmas trees in the plinth 17 of a bowl, and this tree has branches 15 and leaves 16. There is a cavity 14a inside the trunk 14 and branches 15. In the cavity 14a, lead lines 20 are arranged from a plinth 17 to each branch 15, the tip of each branch 15. The end of the lead has a joint, where the optical fiber decoration device II is mounted and connected. The optical fiber decoration device II shown in FIG. 10a can be either types shown in FIG. 1 or FIG. 2, but the type shown in FIG. 1 is preferable. In FIG. 10a, the optical fiber decoration device II, consisting of a plug socket 21, a LED light source 2, and an optical fiber bundle 1a, has two kinds of modes. One type shown in FIG. 10b is that LED 2 has a cylinder 24 and the LED 2 and the plug socket 21 are integrated, and the optical fiber bundle 1a bundled by the annular cylinder 23 is embedded. Another type shown in FIG. 10c is that optical fiber decoration devices I or II are inserted into a plug socket 21. The latter is preferable.

Figure 11:
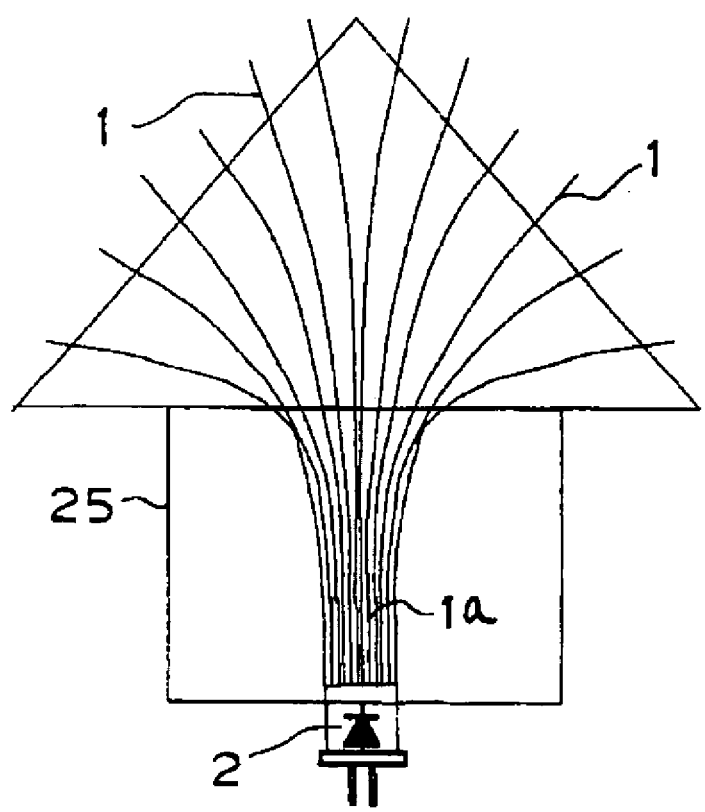
FIG. 11 shows the cross-sectional diagram of the third application example for the optical fiber decoration device of this invention.
Figure 12:
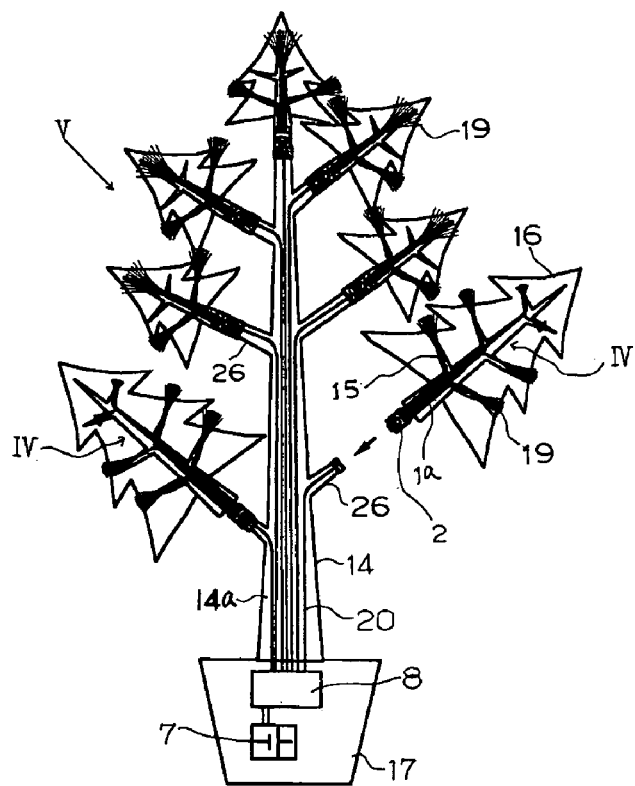
FIG. 12 shows the cross-sectional diagram of the third application example by employing units of the optical fiber decoration device of this invention.

The optical fiber decoration device of this invention is not limited to the types shown in FIG. 1, FIG. 2, or FIG. 4 as mentioned above. As one example, the one marked by sign 25 in FIG. 9 is often enumerated as the type to decorate a house. FIG. 11 shows an enlarged cross-sectional view of the mark 25 in FIG. 9. In FIG. 11, optical fiber tips of the optical fiber decoration device are arranged along the roof of a house shape 25. In this invention, executed configurations of the optical fiber decoration device are explained in FIG. 8 and FIG. 9, it can be used for combination of the executed configurations of the optical fiber decoration device for a Christmas tree. FIG. 12 is a cross-sectional diagram showing another executed configuration of this invention. In FIG. 12, a plug socket 21 is installed at the branch tip 26, and an optical fiber decoration device IV is inserted in this plug socket 21. The optical fiber decoration device IV is designed similar to the one shown in FIG. 8. In the optical fiber decoration device IV, the main body consisting of the cylinder has the LED light source 2, a gap, and the end of the optical fiber. The optical fiber bundle 1a is formed freely without fixing each optical fiber 1. At each branch tip 15, the tip of the optical fiber bundle 1a is usually arranged to spread in flower shape 19 of the morning-glory. By arranging the luminescence controller 8 in a plinth 17 and connecting with each optical fiber decoration device IV by a lead line, various optical decoration patterns can be created according to the types of software. A Christmas tree with fantastic light can be obtained by properly mixing the lights from the LED light source in a plinth 17 with the light from the optical fiber decoration device IV installed in each branch and leaf.

Figure 14:
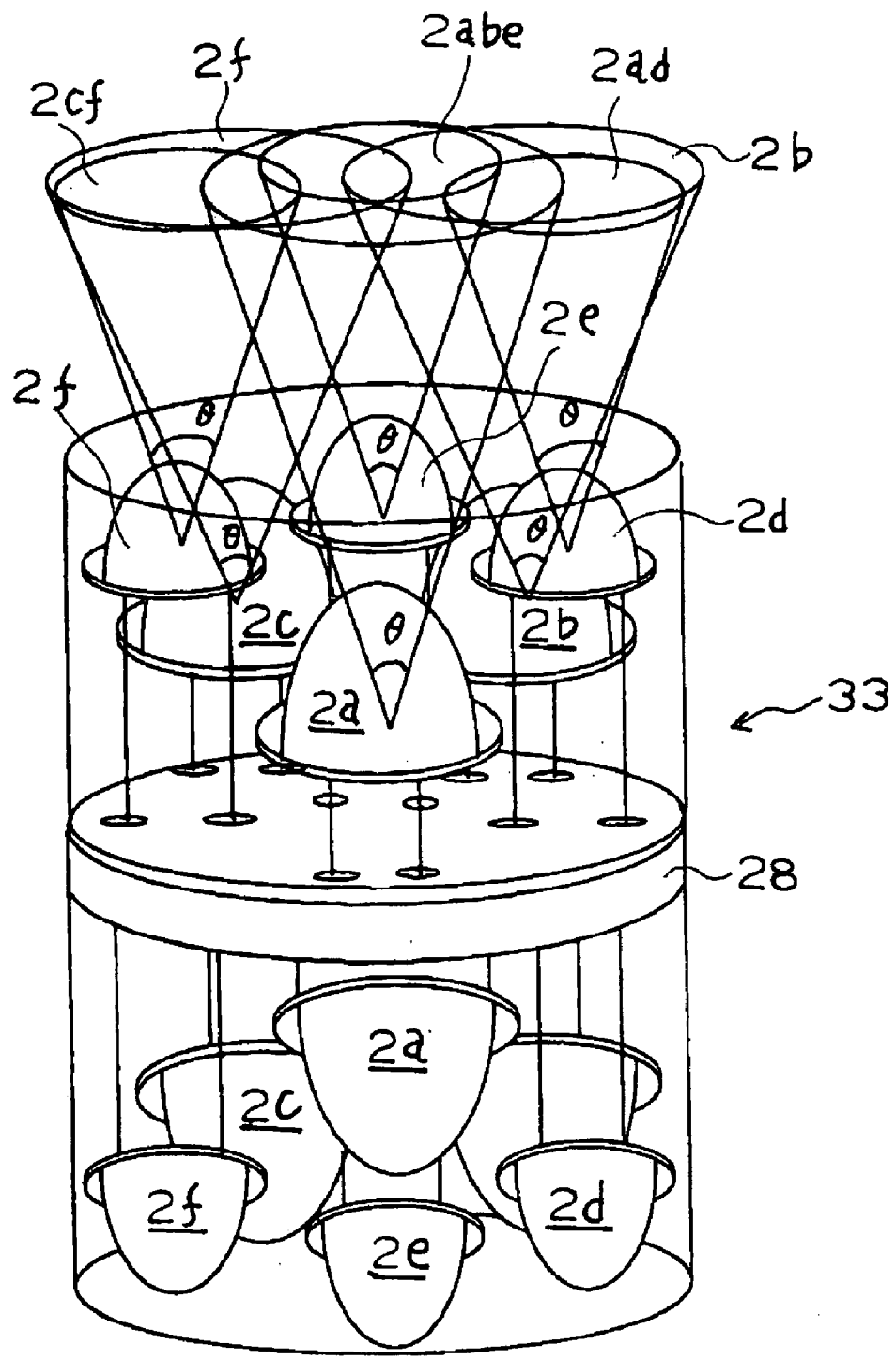
FIG. 14 shows the simple cross-sectional diagram of the LED light source device of this invention.
Figure 15:
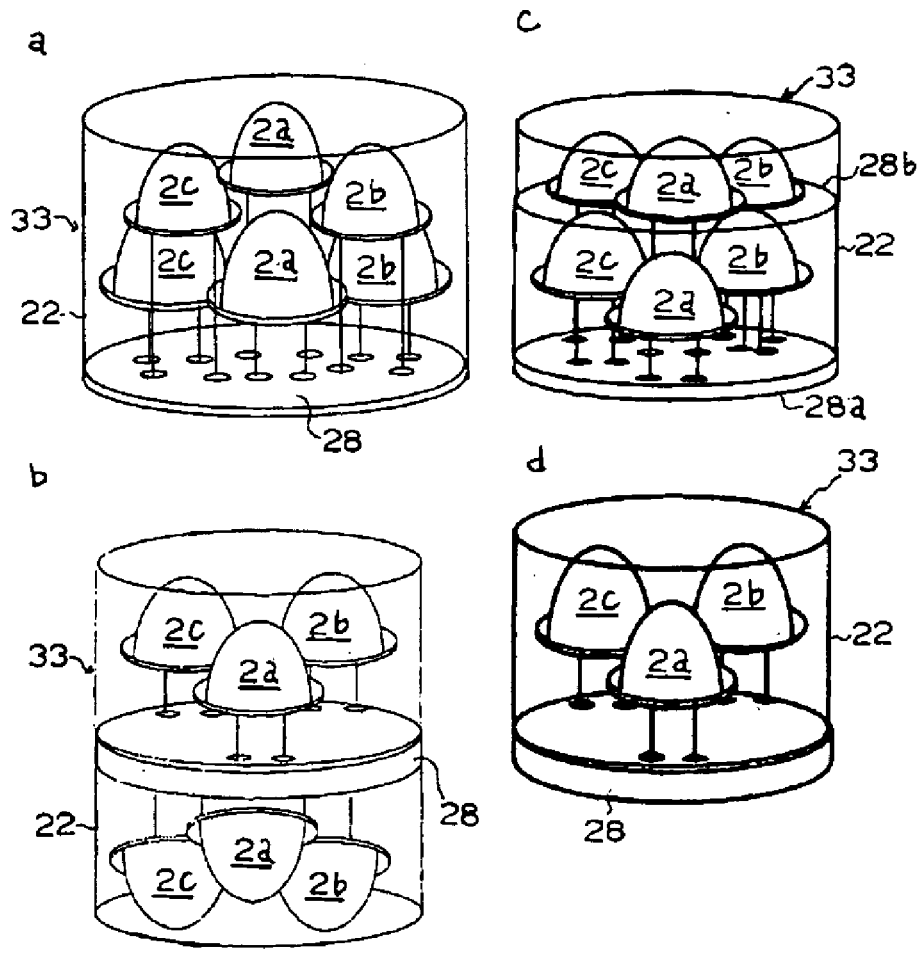
FIG. 15 shows the cross-sectional diagram of the Christmas tree and the light source device for the optical fiber decoration device of this invention.

The optical fiber decoration device, described in the claim 13 of this invention, is a decoration item (refer to FIG. 12) characterized by: the decoration item in the above-mentioned claim 12 consists of decorated part and a support part; the support part contains a power supply and a luminescence controller; LEDs are arranged at the necessary places of the decorated part; electric power is supplied from the lead line connected to the above-mentioned luminescence controller; only and the optical fiber is used by LED as a light source. The executed configuration is a decoration item of the Christmas tree on the market. For example, in the Christmas tree miniature bulbs with different colors are installed on the trunk, branches, leaves of a tree and a power supply is applied from the power supply (AC power) in a plinth with the lead line. The optical fiber decoration device II with built-in power supply shown in FIG. 2 is set up in the part of trunk, branches, and leaves. As a result, the effect of miniature bulbs and the effect of the optical fiber decoration device are expressed mutually, and a more fantastic Christmas tree is obtained. In a Christmas tree explained as an example so far, the LED light source 2 is contained in the plinth 17 in FIG. 8, while LED 2 is installed at branching areas as shown in FIGS. 9 and 12. In addition, an IC circuit and a LED light source can be arranged at the central part or side part of a Christmas tree, so that it can shorten the distance that a LED light source passes through an optical fiber and light emitting out from an optical fiber tip can be made brighter. The invention of the claim 14 of this invention concerns the decoration item characterized by that LED light source devices consisting of a LED light source and an IC board are arranged somewhere on the decoration item, and a light entrance face of the optical fiber is arranged in this LED light source device. The invention of the claim 15 of this invention concerns a decoration item, described in either one of the above-mentioned claim from 1 to 14, characterized by that LED light source devices consisting of a LED light source and an IC board are arranged somewhere on the decoration item, and a light entrance face of the optical fiber is arranged in this LED light source device. The invention of claim 16 of this invention concerns a decoration item in the above-mentioned claim 14 or 15 characterized by the decoration item being a Christmas tree. The explanation is as follows: FIG. 14 is a simple cross-sectional diagram showing the LED light source device in combination of an IC circuit and a LED light source. In FIG. 14, the LED light source device 33 has an IC board 28 in cylinder 22. The LED lamps, that is, LEDs are installed on both sides of this IC board 28. Specifically, on the surface of the IC board 28, LEDs 2a, 2b, and 2c are properly arranged near the board as the first layer, subsequently LEDs 2d, 2e, and 2f are arranged as the second layer. Similarly, on the back of the IC board 28, LEDs 2a, 2b, and 2c are properly arranged as the first layer, subsequently, LEDs 2d, 2e, and 2f are arranged above them as the second layer. The illumination angle of these LEDs is θ, different colors are emitted onto the optical fibers (not shown in the figure, refer to FIG. 1) arranged at the upper part with the illumination angle, θ. In this case, for instance, mixed colors can be obtained by partially mixing light 2a, 2b, and 2c (emitted from LEDs 2a, 2b, and 2c, respectively) with light 2d, 2e, and 2f (emitted from LEDs 2a, 2b, and 2c, respectively, in the second layer). Specifically, the mixed colors 2ad, 2cf, 2af, 2bd, 2bf, 2abd, 2abe, 2abf, and . . . can be obtained. Similar to the upper surface, mixed colors of each light can be also obtained in the back of the IC board 28. In this example, it is explained that LEDs on an IC board were arranged in two layers, it is clear that only the first layer may be arranged to use (refer to FIG. 15d). FIG. 15 is a simple perspective diagram showing the executed configuration of the LED light source device 33. There are various kinds of configurations of the LED light source device 33. In FIG. 15d, the LED unit 2 is formed which contains three illumination LEDs, red 2c, blue 2a, and green 2b, in a container 5 in a cylinder 22. This unit 2 emits lights of three primary colors. Lights in red 2c and green 2b produce a color of yellow 2bc, lights in blue 2a and green 2b produce a color of blue green 2ab (cyanogen), and lights in red 2c and blue 2a produce a color of purple (magenta) 2ac. In FIG. 15b, LEDs 2a, 2b, and 2c are properly arranged on the surface of an IC board 28, while LEDs 2a, 2b, and 2c are properly arranged at the back. The color mixed from each light, emitting from these LEDs, is introduced into the optical fiber. In this example, it is shown that LEDs are arranged on both sides of the IC board 28. In place of this, two IC boards 28 can be fixed on the back of each other by fixing implements, for example, a screw and a bolt (not shown in the figure). In FIG. 15c, LED2a, 2b, and 2c are arranged on an IC board 28a, while LED2a, 2b, and 2c (different colors emitting from these LEDs are acceptable) are arranged on IC board 28b consisting of transparent board above the IC board 28a. In this case, the IC board 28a and the IC board 28b can be fixed, turned, or moved or rotated. These LED light source devices 33 is combined with the above-mentioned controller, light can be changed to various colors periodically by the rotation and cyclic movement of transparent board 31. In other words, the color mixture created from each color in these operations, and the fantastic world is produced. In FIG. 15d, LED2a, 2b, and 2c are arranged on IC board 28a.

Figure 16:
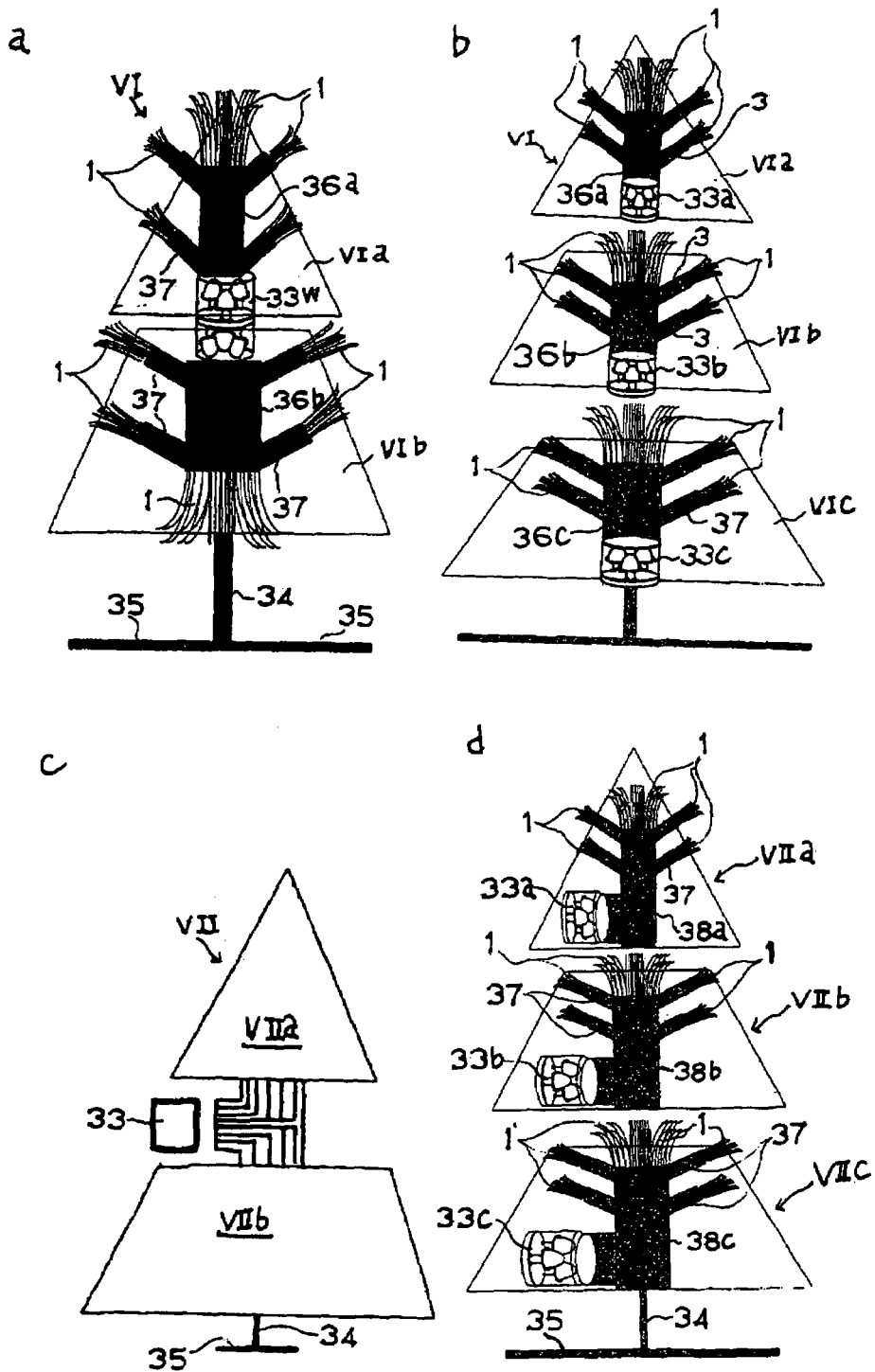
FIG. 16 shows the cross-sectional diagram of the Christmas trees on which the LED light source device was employed of this invention.

FIG. 16 is a cross-sectional diagram showing the LED light source device arranged in a Christmas tree. FIG. 16a is a cross-sectional diagram showing the device build in the trunk of the Christmas tree. FIG. 16b is a cross-sectional diagram showing multiple LED light source devices that are built in. In FIG. 16a, as for LED light source device 33, a LED light source device 33w was built in the trunk (the center part of a Christmas tree VI), the top and bottom part of the LED light source device 33 is arranged with the upper and lower parts of a Christmas tree, respectively. Concerning the upper and lower parts of these Christmas trees, trunk contains the optical fiber built-in parts 36a and 36b, and branch consists of side part 37 in the cylinder (not limited to a cylinder, it can be a triangle, a square, and a hexagon), a part of the optical fiber 1 contained in this cylinder is exposed through the side part 37 and. Moreover, the support stick 34 is set up as a stand. To support the Christmas tree, the support stick 34 is installed on a support part 35. The support part 35 can be installed by a proper method. In this example, it is not necessary to install a plinth since it is not necessary to employ the LED light source equipment 33 in a plinth while supporting a Christmas tree by the support part 35. Since the LED light source device 33 is not contained in a plinth from this structure, it is not necessary to install a conventional plinth, that is, a plinth is not needed. Thus, it enables us to make a Christmas tree with the advantages of low cost, waterproof, energy saving, and while being safe. Since the LED light source device 33 can be arranged in a suitable place on a Christmas tree VI as shown in this example, an outstanding effect is achieved: it is extremely simple, economical, and easy to construct a huge Christmas tree, only by increasing the number of these LED light source devices 33.

In FIG. 16b, Christmas tree VI consists of blocks VIa, VIb, and VIc of a Christmas tree. These blocks VIa, VIb, and VIc have LED light source devices 33a, 33b, and 33c, respectively, which constitutes a part of the trunk. In the cylinders 36a, 36b, and 36c of each block, the branch contains side part 37, and a part of optical fiber 1 contained in this cylinder is exposed through the side part 37. The Christmas tree VI is formed in combination of blocks VIa, VIb, and VIc successively. FIG. 16c is the cross-sectional diagram showing the LED light source device horizontally installed near the central part of a Christmas tree. In FIG. 16c, the LED light source device 33 is horizontally installed near the center part of Christmas tree VI, and is closely joined or connected with the optical fiber 1. The trunk of a Christmas tree VI has the support stick 34 in the lower part, and also has a support part 35 to get further standing stability of a Christmas tree. Since the LED light source device 33 was horizontally installed near the central part of Christmas tree VI, light can be distributed from optical fibers 1 employed on both VIa(s) and VIb(s) of Christmas tree VI. Because of the length of optical fibers can be shortened and a plinth is not required, this enables us to reduce the overall weight by installing a support stick 34 in a stripe part 35 for easy carrying and the reduction in cost. In FIG. 16c, the LED light source device 33 is arranged in the center part of Christmas tree VI and the side part of a trunk, instead of arranged in the plinth. Therefore, it is not necessary to install a plinth, sticking foot in the ground, that is, a support stick instead of plinth, is installed as described later. The support part 35 can also be installed to get further stability. Since the LED light source device 33 is not contained in a plinth, plinth can be made much smaller than a conventional plinth, or a plinth is not required. Thus, a Christmas tree can be produced with advantages of low cost, waterproof, energy saving, and while being safe. Since the LED light source device 33 can be arranged in the suitable place on a Christmas tree VI as shown in this example, an outstanding effect is achieved: it is extremely simple, economical, and easy to construct a huge Christmas tree, only by increasing the number of these LED light source devices 33. When a Christmas tree VI is comparatively small, LED light source device 33 can be installed in the plinth instead of installation in a Christmas tree. In this case, the plinth itself can be comparatively small, so that it can reduce the material cost and easy carrying.

Figure 19:
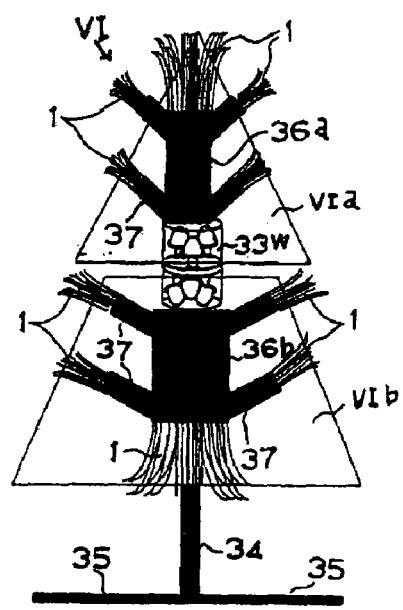
FIG. 19 shows the cross-sectional diagram of the Christmas tree stand with LED light source device of the invention.
Figure 19:
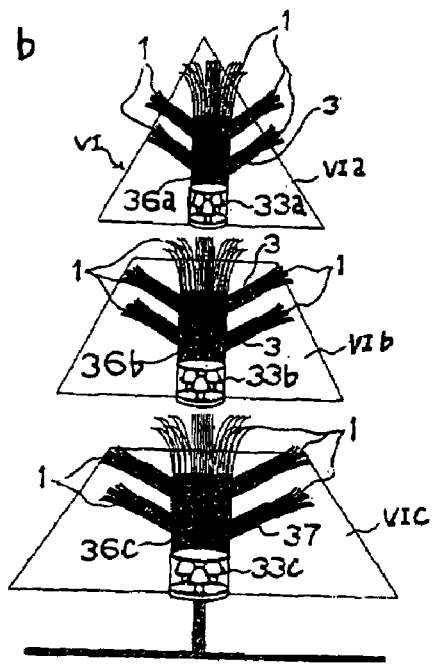
Figure 19:
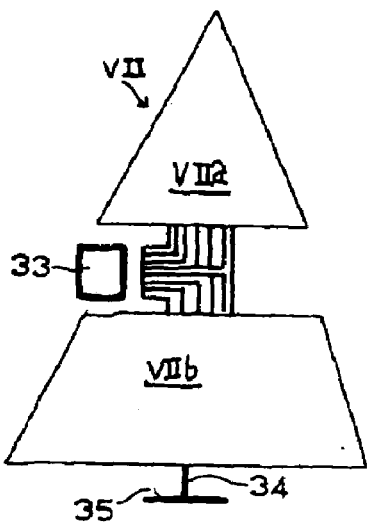
Figure 19:
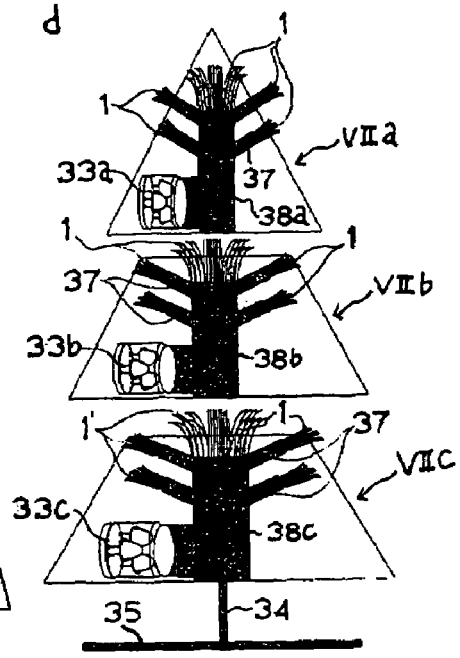

FIG. 16d is a cross-sectional diagram showing the arrangement LED light source device 33 in a Christmas tree VII. In FIG. 16d, the LED light source device 33 consists of blocks VIIa, VIb, and VIc of a Christmas tree. Each block VIIa, VIb, and VIc has the LED light source device 33a, 33b, and 33c, respectively, which constitutes a part of trunk. The cylinders 36a, 36b, and 36c of each block have LED light source devices 33a, 33b, and 33c connected to the side part of these lower parts. The lights emitting from these LED light source devices 33a, 33b, and 33c pass through the optical fiber 1 arranged in the predetermined place and is exposed from the tip of the optical fiber 1. In cylinders 36a, 36b, and 36c, branches contains side parts 37, a part of optical fiber 1 contained in these cylinders is exposed through this side part 37. This Christmas tree VII is constituted in combination of blocks VIIa, VIb, and VIc successively. Since the LED light source device 33 is not necessarily stored in a plinth in this structure, plinth can be made much smaller than a conventional plinth or a plinth is not required. Thus, a Christmas tree can be produced with advantages of low cost, waterproof, energy saving and while being safe. Since the LED light source device 33 can be arranged in the suitable place on a Christmas tree VII as shown in this example, an outstanding effect is achieved: it is extremely simple, economical, and easy to construct a huge Christmas tree, only by increasing the number of these LED light source devices 33. In this invention, there are various configurations to arrange LED light source devices 33 as shown in FIG. 16a–d. In addition to these ways, as shown in FIG. 19, LED light source device 33a is not arranged in the Block VIa, two LED light source devices 33a and 33b can be arranged at an upper and a lower part of the block VIb. Thus, it is arbitrary to combine the cylinder 36a consisting of an optical fiber 1 with more than two LED light source devices 33 in a Christmas tree.

Figure 17:
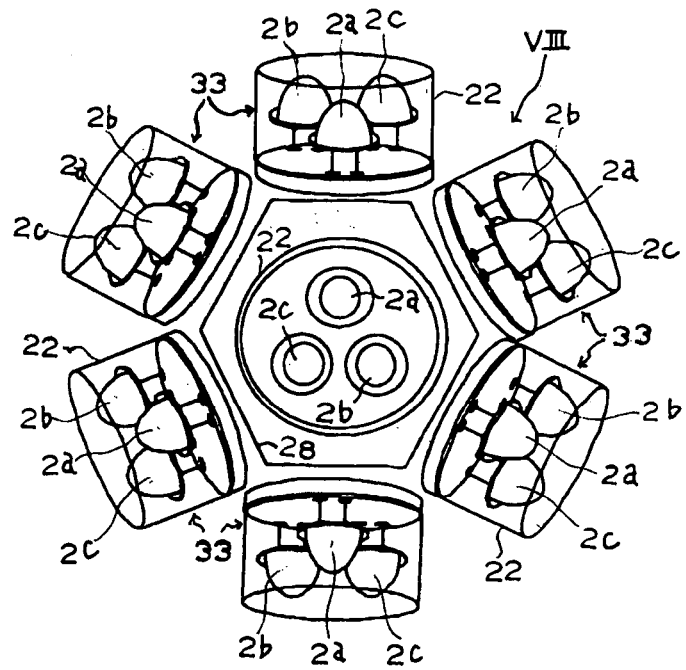
FIG. 17 shows the configuration of multiple LED light source devices used for Christmas trees of this invention.
Figure 18:
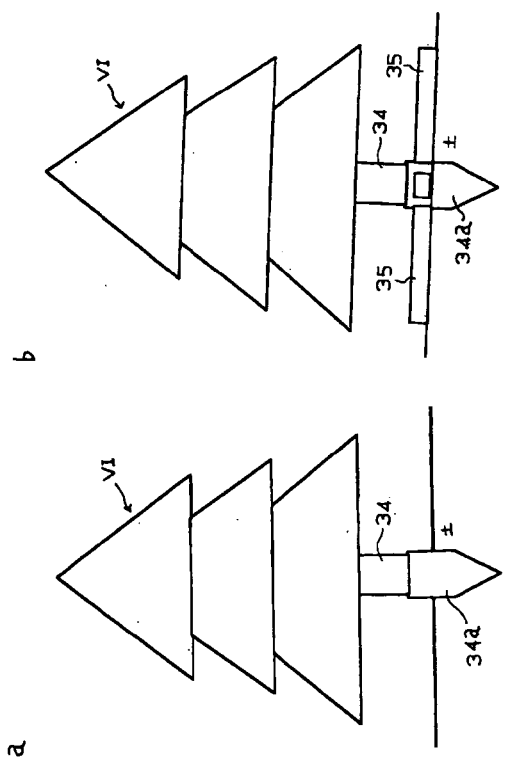
FIG. 18 shows the Christmas tree stand with LED light source device of this invention.

FIG. 17 is a plan-view diagram showing the configurations to arrange multiple LED light source devices. As for the LED light source device VIII arranged in all directions, six LED light source devices 33 were arranged on each side of a hexagon, each LED light source device 33 is arranged at the top and bottom of the hexagon, respectively. According to the configuration, an optical fiber 1 can be installed in all parts of a Christmas tree with the shortest distance. An extremely bright light can be emitted from the tip of an optical fiber 1 by this arrangement. FIG. 18 is a simple cross-sectional diagram showing the configuration of a stand of Clinker being one of the decoration items of this invention. In the example as shown in FIG. 18a, the lower part of a Christmas tree VIII consists of a support stick 34, and this support stick has a metal fitting 34a tapered at the tip in order to make it easy to stick into the ground. As a result, it is extremely easily to drive it to the ground, and a Christmas tree VIII can be supported with good stability. In this case, the trunk of Christmas tree VIII can either be embedded and connected directly to a metal fitting 34a, or be embedded in a lent support stick. In the example of FIG. 18b, a support part 35 can be installed on a metal fitting 34a which is attached on a support stick 34 of Christmas tree VIII. The support part 35 can be installed by a proper method, for example, by a screw. The installed support part can be fixed permanently, and only the support part 35 can be folded. The optical fiber decoration item, described in the claim 17 of this invention, is characterized by that a decoration item described in the claim 13 is a Christmas tree formed by arranging and connecting the unit of the optical fiber decoration device, described in the above-mentioned claim 9, on branches and in the vicinity of the treetop through multiple joints. In this case, since the LED light source, the optical fiber, and the battery are integrated as indicated in the above-mentioned claim 9, the optical fiber decoration device can be installed on each branch of a Christmas tree with the required number, an excellent effect is achieved: the decoration items such as a Christmas tree can are easily produced.

Figure 13:
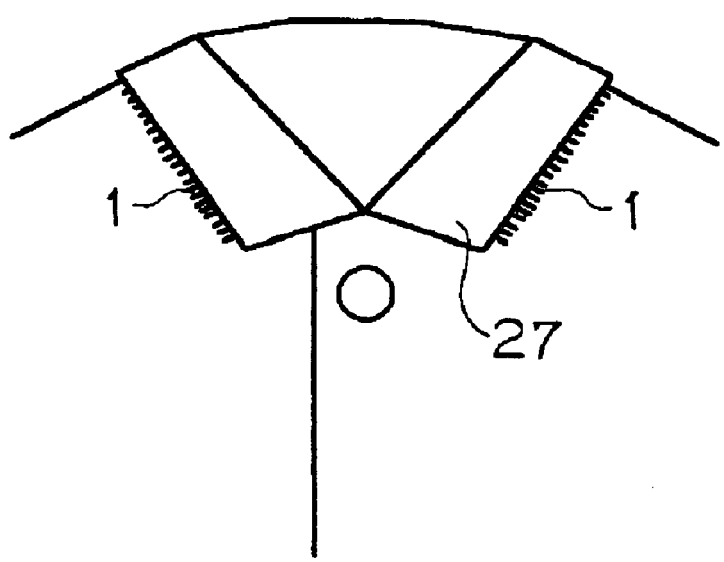
FIG. 13 shows the clothes with the optical fiber decoration device of this invention.

The optical fiber decoration item, described in the claim 18 of this invention, is a decoration item characterized by that the decoration item, described in the above-mentioned claim 13, is a Christmas tree and the shape of a Christmas tree is formed by combining and connecting more than two of the units of the optical fiber decoration devices described in the above-mentioned claim 9. The optical fiber decoration item described in the claim 19 of this invention is clothing characterized by decoration using the optical fiber decoration device, described in either one of the above-mentioned claim from 1 to 13. FIG. 13 is a part of front chart showing the decoration of the part of the collar of clothes. In FIG. 13, the clothes are made by using the optical fiber decoration device shown in FIG. 5. That is, the optical fiber decoration device consists of LEDs, optical fibers, a luminescence controller, and a battery. The main, body of the LED light source is installed on the back side of a collar 27, and the tips of optical fiber 1 are arranged along the edge of the collar 27. The optical fiber decoration item, described in the claim 20 of this invention, is that clothes described in the above-mentioned claim 19 are wedding dresses. In the case of a wedding dress, optical fiber decoration devices are installed at the edges of a collar and a sleeve, in the vicinity of a breast and the necessary part of a skirt. Because the LED light source is used, the wedding dress can be dressed with light overall weight and without any resistance. In addition, clothes can also be the clothing for Santa Claus or the dress on which the above-mentioned optical fiber decoration devices are mounted. The above-mentioned optical fiber decoration devices can also be mounted on clothes dressed on stage such as plays, and the clothes dressed by street musicians and street performers.

Effect Of Invention

Concerning the optical fiber decoration device described in the claim 1 of this invention, multiple LEDs emitting at least monochromatic or polychromatic light are installed at the end of the optical fiber. Since it has these LED light sources that enable the color mixing by overlapping some of these lights, the power consumption is low. Thus, there are the following excellent effects: no danger of fire due to the heat generated from the lamp and the adaptor, simple and economical waterproof design, ability to use battery, good portability, long lifetime, and low failure from accidents during transportation. The optical fiber decoration device, described in the claim 2 of this invention, is integrated from the end of the optical fiber with the head of LED, thus the optical decoration using optical fibers is simple and economical. The optical fiber decoration device, described in the claim 3 of this invention, has a condenser lens arranged between multiple LED light sources and an optical fiber bundle, it is possible to collect the LED light emitting from multiple LED light sources and guide light to the light entrance of the optical fiber bundle. Thus, a very bright LED light can emit from the tip of the optical fiber. Concerning the optical fiber decoration device described from the claim 4 of this invention, since the luminosity of singular or multiple LEDs can be gradually changed, it is possible to express the effects from blinking to constantly monochromatic as well as polychromatic light, and enables to make decoration items a fantastic appearance.

Concerning the optical fiber decoration device described in the claims 5 of this invention, three primary colors and multiple colors from the color mixing can be created by independently changing luminosity of each of the multiply LEDs, while enables one to make decoration items with a fantastic appearance. Concerning the optical fiber decoration device, described in the claim 6, various fantastic decorations can be carried out automatically and correspondingly with the type of software by controlling the luminosity of the LED using a microcomputer. Concerning the optical fiber decoration device described in the claim 7 of this invention, the operations of blinking or continuous illumination can be simply carried out by changing the emitting color or the luminosity manually. Concerning the optical fiber decoration device described in the claims 8 of this invention, a decoration item can be obtained triggered from the surrounding environment, changing with the sound or the color and a fantastic show can be produced by changing luminosity through sound and light which is detected by a sensor. Concerning the optical fiber decoration device described in the claim 9, by using the unit integrated from the optical fiber decoration device and the LED power supply, the decoration effect can be acquired by attaching the unit in a desired place, and it has the excellent qualities of simple and easy handling. Concerning the optical fiber decoration device described in the claim 10, by using the power supply obtained from the solar cell, a storage battery can be charged in daytime and the electricity can be used at nighttime, and thus resources are saved. Concerning the optical fiber decoration device described in the claims 11, the optical fiber decoration device can be established in the outdoors because at least a part of the optical fiber decoration device is waterproof, and decoration items have long lifetime. Concerning the decoration item described in the claim 12 of this invention, decoration using optical fiber decoration devices, described in either one of the above-mentioned claim from 1 to 11, has the following exceptionally excellent effects: enabling the free and fantastic decoration, no danger of fire due to the heat generated from the lamp and the adaptor because of low power consumption in usage, simple and economical waterproof design, ability to use battery, good portability, long lifetime and no failure from accidents during transportation.

The optical decoration device described in the claim 13 of this invention is characterized by: the decoration item, described in the above-mentioned claim 12, consists of decorated part and a support part; the support part contains a power supply and a controller; LEDs are arranged at necessary places of the decorated part; the electric power is supplied from the lead line connected by the above-mentioned controller; light is emitted from the LED light source. Especially when producing a big decoration item, no sufficient LED light can reach the tip of an optical fiber, the outstanding effect can be achieved without fear of insufficient luminosity since the optical fiber decoration device can be installed at a desired position by using a lead. Concerning the decoration item described in the claim 14 of the invention, LED light source devices consisting of a LED light source and an IC board are arranged somewhere on the decoration item, and a light entrance face of the optical fiber is arranged in this LED light source device. So that a plinth can be far smaller than the conventional one, or plinth is not required. An excellent decoration item can be made with low cost, waterproof, energy saving, and while being safe. In LED light source devices 33 as shown in this example, since it can be arranged in the suitable place on a decoration item, an outstanding effect is achieved: it is extremely simple, economical, and easy to construct a huge Christmas tree, only by increasing the number of these LED light source devices 33. Concerning the decoration item, described in the claim 15 of this invention, decoration item is characterized that LED light source devices consisting of a LED light source and an IC board are arranged somewhere on the decoration item, and a light entrance face is arranged on the optical fiber in this LED light source device, so that a plinth can be far smaller than the conventional one, or plinth is not required. An excellent decoration item can be made with low cost, waterproof, energy saving, and while being safe. In LED light source devices 33 as shown in this example, since it can be arranged in the suitable place on a decoration item, an outstanding effect is achieved: it is extremely simple, economical, and easy to construct a huge Christmas tree, only by increasing the number of these LED light source devices 33.

Concerning the decoration item described in the claim 16 of this invention, the decoration item described in the above-mentioned claim 14 or 15 is a Christmas tree. An outstanding effect is achieved: it is extremely simple, economical, and easy to construct a huge Christmas tree, only by increasing the number of these LED light source devices 33, since the LED light source device can be arranged in a suitable place on a Christmas tree. Since LED light source devices 33 as shown can be arranged in the suitable place on a decoration item, an outstanding effect is achieved: it is extremely simple, economical, and easy to construct a huge Christmas tree, only by increasing the number of these LED light source devices 33. Concerning the optical fiber decoration device described in the claim 17 of this invention, the decoration item in the above-mentioned claim 13 is a Christmas tree, since optical fiber is arranged in the vicinity of branch tips and a treetop by connecting multiple units of the optical fiber decoration device described in the above-mentioned claim 9 at the joint, the unit contains LED light source. Since optical fiber decoration device can be installed in a desired position using a lead line, the kind of optical fiber decoration devices can be changed without fear of insufficient luminosity at the installation pace. Concerning the decoration item described in the claim 18 of this invention, the decoration item, described in the above-mentioned claim 13, is a Christmas tree, a Christmas tree shape can be formed in connection of more than two units of optical fiber decoration devices, described in the above-mentioned claim 9. So that the entire Christmas tree can be brightened, a big Christmas tree can be manufactured by an easy assembly, and an economical and excellent Christmas tree can be obtained. Concerning the clothes described in the claim 19 of this invention, from decoration using optical fiber decoration devices, described in either one of the above-mentioned Claims from 1 to 13, A LED light decoration can be easily carried out to clothes with light-weight decoration items. In clothes described in the claim 20 of this invention, especially when clothes described in the above-mentioned claim 19 is a wedding dress, the optical decoration makes a wedding dress much more gorgeous, an outstanding effect of wedding dress was achieved with very light-weight and easily wearing without any resistance.

What is claimed is:

1. An optical fiber decoration device having an LED light source, the LED light source has multiple LEDs arranged at the end of the optical fiber to emit at least monochromatic or polychromatic light, and also enables the color mixing by overlapping of some of these lights before entering into the end of the optical fiber, the distance from the point of the emitting light out of the LED to the light entrance of the optical fiber being larger than the intersection of illumination lights out of LEDs, or a lens being inserted between the optical fiber and the LED, one or more LEDs being moved up and down, left and right, slant, with proper angles, with back and forth motion, or with regular and irregular rotation relative to the said end of the optical fiber, or LEDs with different illumination angle being used, which include LEDs with different diameter.

2. An optical fiber decoration device of claim 1, wherein the end of the optical fiber and the head of LED are integrated.

3. An optical fiber decoration device of claim 2, wherein said device is between multiple LEDs and an optical fiber bundle arranged as a condenser lens.

4. An optical fiber decoration device of claim 3, wherein the luminosity of singular or multiple LEDs at least gradually change.

5. An optical fiber decoration device of claim 4, wherein said device can create multiple colors that are added colors for mixing by independently changing the luminosity of each of the multiply LEDs.

6. An optical fiber decoration device of claim 5, wherein the luminosity of the LED are controlled by a microcomputer.

7. An optical fiber decoration device of claim 6, wherein emitting color or luminosity can be changed by a manual switch.

8. An optical fiber decoration device of claim 7, wherein luminosity is changed by detection of sound and light with a sensor.

9. An optical fiber decoration device of claim 8, wherein said device consisting of a power supply, a LED light source, and an optical fiber bundle, wherein the power supply, the LED light source, and the optical fiber bundle are integrated together; or the power supply and the LED light source, including a first cylinder, are integrated together, and the optical fiber bundle is bundled by a second cylinder which can be inserted into the first cylinder; or the optical fiber bundle and the LED light source are integrated into a part, and the part can be attached to the power supply.

10. An optical fiber decoration device of claim 9, wherein said device uses a unit that integrates the optical fiber decoration device and the LED power supply.

11. An optical fiber decoration device of claim 10, wherein said device uses power supply obtained from solar cells as a power supply for the LED.

12. An optical fiber decoration device of claim 11, wherein at least a part of the optical fiber decoration device is waterproof.

13. An optical fiber decoration device of claim 12, wherein the optical fiber decoration device is waterproof and fireproof, and the power supply can be a solar cell or a storage battery.

14. A decoration item for use with the optical fiber decoration device of claim 1.

15. The decoration item of claim 14, wherein said decoration item consists of a decorated part and a support part; the support part contains a power supply and a controller; LEDs are arranged at necessary places of the decorated part; the electric power is supplied from a lead line connected by the controller; light is emitted from the LED light source.

16. A decoration item of claim 15, wherein the decoration item has LED light source devices, wherein the LED light source devices consist of a LED light source and an IC board arranged on the decoration item, and a light entrance face of the optical fiber is arranged in the LED light source device.

17. A decoration item of claim 16, wherein the LED light source is arranged on one side of the IC board.

18. A decoration item of claim 17, wherein the LED light source devices consist two or more LED light sources and an IC board arranged on the decoration item, and a light entrance face of the optical fiber is arranged in the LED light source device, the LED light sources being arranged on both sides or a circumference of the IC board, respectively, and the LED light source devices further include a plurality of IC boards which control the LED light sources.

19. A decoration item of claim 18, wherein the LED light source devices include multiples optical fiber bundles which can be inter-crossed.

20. A decoration item of claim 19, wherein the decoration item is a Christmas tree.

21. A decoration item of claim 15, wherein the decoration item is a Christmas tree, the optical fiber is arranged on branches and in the vicinity of a treetop by connecting multiple units through a connection part, each of which is a unit that integrates the optical fiber decoration device and the LED power supply.

22. A decoration item of claim 15, wherein a Christmas tree and the shape of a Christmas tree is formed by combining and connecting more than two of the units through a connection part, each of which is a unit that integrates the optical fiber decoration device and the LED power supply.

23. A decoration item of claim 15, wherein clothes use optical fiber decoration devices.

24. A decoration item of claim 23, wherein the clothes are wedding dresses.

* * * * *